United States Patent [19]
Allen et al.

[11] Patent Number: 5,245,460
[45] Date of Patent: Sep. 14, 1993

[54] INFRARED NETWORK ENTRY PERMISSION METHOD AND APPARATUS

[75] Inventors: Richard C. Allen, Los Gatos; Robert J. Grady, Windsor; Louis R. Janis, Campbell; John Piccone, San Jose; Bernard E. Stewart, Campbell, all of Calif.

[73] Assignee: Photonics Corporation, San Jose, Calif.

[21] Appl. No.: 892,221

[22] Filed: Jun. 2, 1992

Related U.S. Application Data

[62] Division of Ser. No. 331,607, Mar. 30, 1989, Pat. No. 5,119,226.

[51] Int. Cl.$^5$ ............................................. H04B 10/10
[52] U.S. Cl. ................................... 359/155; 359/159; 359/172
[58] Field of Search ............... 359/115, 118, 125, 137, 359/155, 158, 159, 165, 172

[56] References Cited

U.S. PATENT DOCUMENTS 4,506,360 3/1985 Kryskow, Jr. et al. ............... 370/85
4,881,074 11/1989 Reichbauer et al. ............ 340/825.05

FOREIGN PATENT DOCUMENTS 0000235 1/1984 Japan ..................... 455/617
61-23427 1/1986 Japan ..................... 455/617
63-59229 3/1988 Japan ..................... 455/607

*Primary Examiner*—Leslie Pascal
*Attorney, Agent, or Firm*—Haverstock, Medlen & Carroll

[57] ABSTRACT

The present invention is for a radiation transmitter which transmits radiation to an illumination spot for forming reflected radiation. The transmitter includes a plurality of radiation transmission sources. Each of the sources transmits to a portion of the illumination spot. The transmitter includes means for alternately activating a portion of the transmission sources to illuminate a portion of the illumination spot for aligning a radiation receiver to receive the reflected radiation.

Each resident of network transmits in turn its address and the address of each resident that it recognizes. Once a prospective resident can recognize each resident of the network it announces that it is joining the network and states its new address and the address of each resident it can see. Every resident then amends its list of recognized residents to include the new member.

6 Claims, 5 Drawing Sheets

INFRARED NETWORK ENTRY PERMISSION METHOD AND APPARATUS

This is a divisional of application Ser. No. 07/331,607, filed Mar. 19, 1989 now U.S. Pat. No. 5,119,226.

FIELD OF THE INVENTION

This invention relates to the field of data communication. More particularly, this invention relates to the field of communication between more than two residents on a data communications network over an infrared medium such as in a local area network, LAN.

BACKGROUND OF THE INVENTION

Data communication via infrared radiation is disclosed in the co-pending application INFRARED DATA COMMUNICATIONS, serial number 184,261. That application describes an invention for an apparatus for wireless communication of information between two locations. A transmitter means modulates and transforms the information into infrared radiation at a first location. The infrared radiation is transmitted by the transmitter to a reflecting surface along a straight line path which is transparent to the infrared radiation. The infrared radiation is diffusely reflected at the reflecting surface forming reflected infrared radiation. A receiver means for receiving the reflected radiation from the reflecting surface is positioned at a second location. The second location and the reflecting surface have a straight line path there between which is transparent to the infrared radiation.

In a second co-pending application INFRARED NETWORK TRANSCEIVER APPARATUS, serial number 271,570, an apparatus is disclosed for an illumination transmitter. The transmitter projects a signal onto a planar reflective surface such as the ceiling of an open office environment. The transmitter includes a plurality of illumination sources positioned in a line wherein the line has a predetermined orientation to the planar surface. The illumination sources are preferably infrared LED's. The transmitter has means for jointly aiming the illumination sources toward a desired location on the planar surface. The location on the planar surface is usually used to allow multiple transmitters coupled to infrared receivers to allow communication between computers in a LAN. The transmitter also includes means for maintaining the predetermined orientation between the planar surface and the line. The orientation is usually parallel to allow transmitters located large distances from the illumination to project a relatively small illumination spot onto the planar surface.

In a LAN there are a plurality of distributed computers, terminals and peripherals. In a hard wired LAN, collision detection and avoidance relies upon the fact that each resident on the network can detect every other network resident. In an infrared network it is possible that not every resident on the network can communicate with every other resident. FIG. 1 shows a situation where three network residents 20, 22 and 24 are located within a room 26. Transceiver 20 is positioned across the room from its projected spot 28 on the ceiling. Because the illumination spreads out as it travels the illumination projection 28 for the transceiver 20 can be relatively large. In contrast, transceivers 22 and 24 direct their infrared illumination almost straight up toward the ceiling forming smaller illumination projections 30 and 32, respectively. Each of these smaller illumination projections 30 and 32 fall within illumination projection 28. Accordingly, the LAN resident at transceiver 20 (transceiver 20) can communicate with both transceivers 22 and 24. However, as indicated in FIG. 1, the illumination projections 30 and 32 do not overlap. This prevents the transceivers 22 and 24 from communicating with one another over the infrared network.

If transceiver 22 and transceiver 24 are unaware of one another, it is possible that both these transceivers 22 and 24 could attempt to transmit information to transceiver 20 at the same time. This results in a transmission collision so that transceiver 20 merely receives two message at the same time and results in incorrect reception of information. This situation does not exist in a LAN employing cable.

A method is needed for properly aligning the illumination projections of infrared transceivers into a network to establish communication among all transceivers. The method and apparatus should include means to prevent collision transmission as additional transceivers are added to an established network.

SUMMARY OF THE PRESENT INVENTION

The present invention is for a radiation transmitter which transmits radiation to an illumination spot for forming reflected radiation. The transmitter includes a plurality of radiation transmission sources. Each of the sources transmits to a portion of the illumination spot. The transmitter includes means for alternately activating a portion of the transmission sources to illuminate a portion of the illumination spot for aligning a radiation receiver to receive the reflected radiation.

Each resident of network transmits in turn its address and the address of each resident that it recognizes. Once a prospective resident can recognize each resident of the network it announces that it is joining the network and states its new address and the address of each resident it can see. Every resident then amends its list of recognized residents to include the new member.

DETAILED DESCRIPTION OF THE PREFERRED EMBODIMENT

There are two conditions which must be met prior to a new resident joining a network utilizing a infrared transmission medium. The first is proper alignment between all of the residents so that each resident can communicate with every other resident. The second is permission to enter after proper alignment has been achieved.

Figure 2:
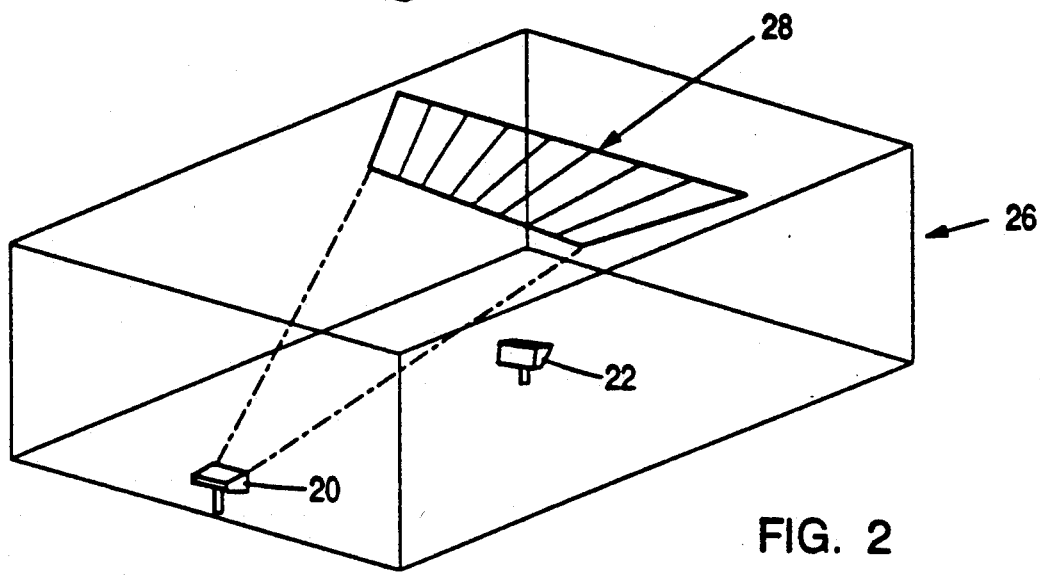
FIG. 2 is a perspective view of the illumination projection of each of the eight LED's in the transceiver.

As shown in FIG. 2 each of the LEDs in the transmitter portion of transceiver 20 transmits a portion of the entire illumination spot 28 on the ceiling of the room 26. All eight of the LEDs are flashed simultaneously during data transmission to increase the intensity and size of the illuminated spot and thereby reduce or eliminate transmission of errors. Nevertheless, it is possible to activate any one or group of these LEDs as desired.

Figure 3:
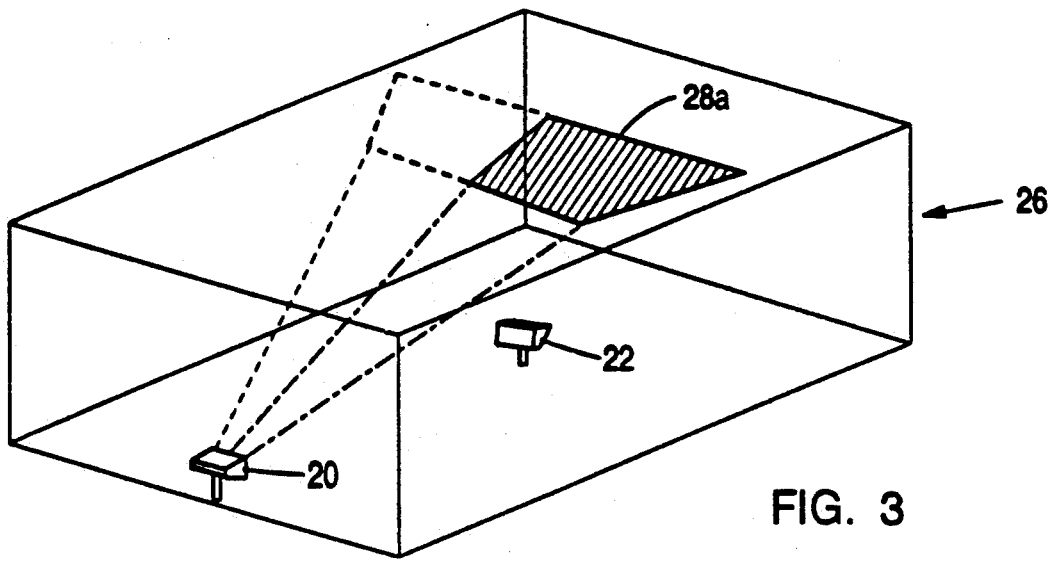
FIGS. 3-8 are perspective views of the alignment technique according to the present invention.
Figure 4:
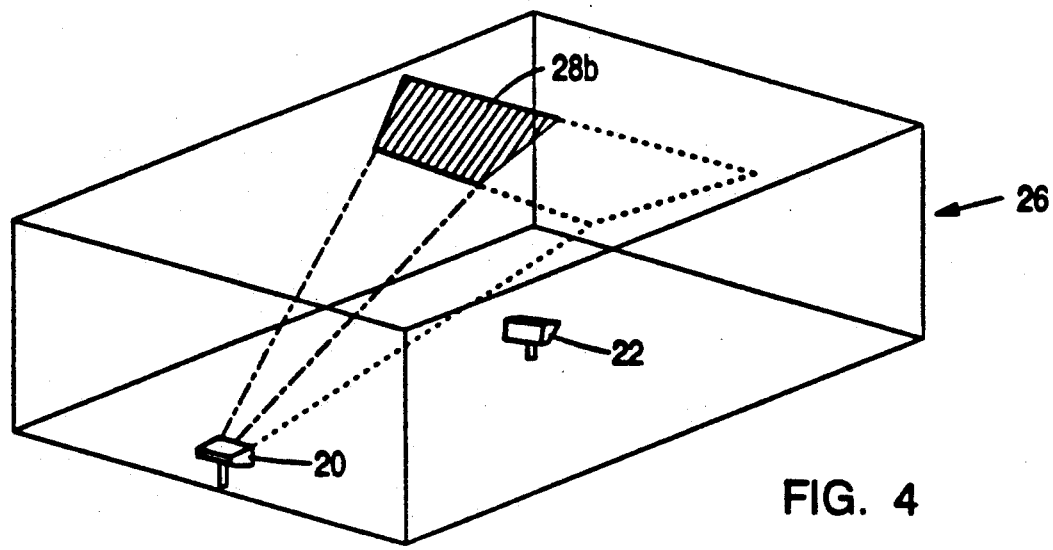

FIG. 3 shows transceiver 20 located within room 26. Transceiver 20 projects illumination spot 28a using only the right four of its eight infrared LEDs. FIG. 4 shows transceiver 20 projecting illumination spot 28b using only the left four of its eight LEDs.

Each transceiver is designed so that the view of its photosensitive receiver is approximately identical to the illumination projection of its entire array of LEDs. Accordingly, the illumination projection 30 for transceiver 22 is approximately identical to the field of view which the receiving portion of transceiver 22 senses. For purposes of this explanation, it will be assumed that the transmission and receiving fields of view are identical for each transceiver. Accordingly, illumination spot 30 is also the field of view for transceiver 22.

Figure 5:
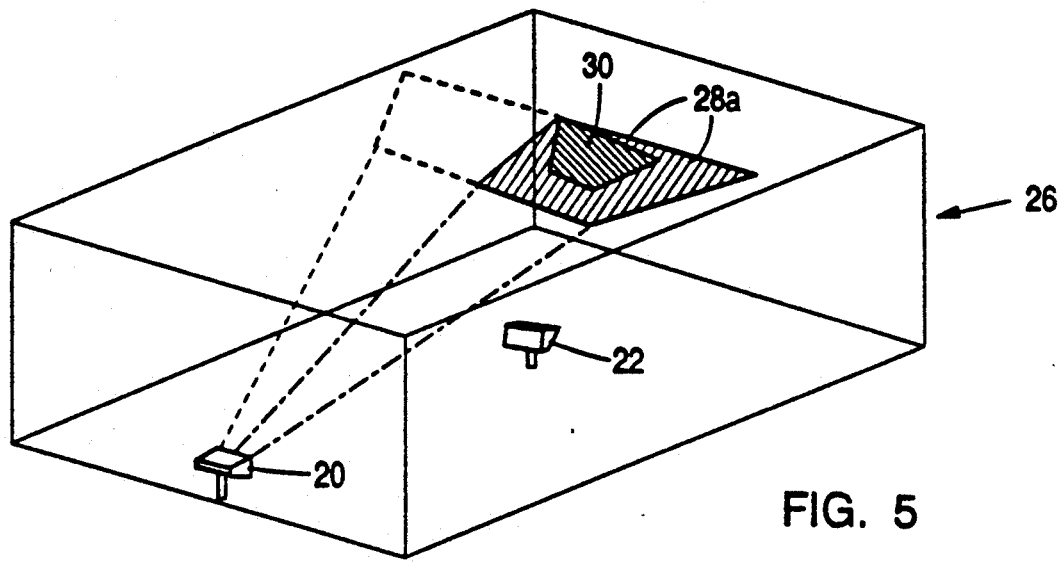
Figure 6:
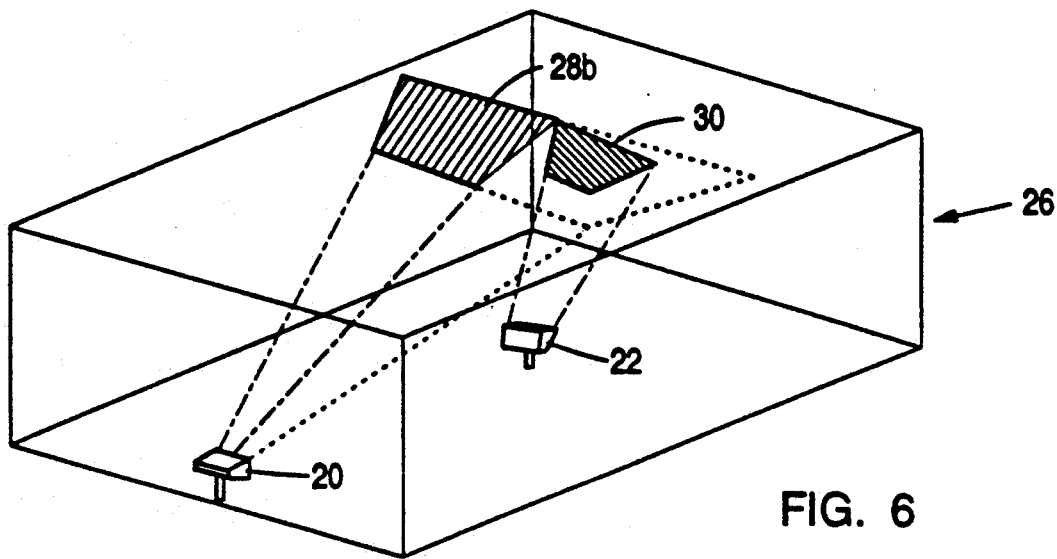

FIG. 5 shows transceiver 22 with its illumination projection 30 and transceiver 20 with its right half illumination projection 28a. The field of view 30 for transceiver 22 is entirely within the right half illumination projection 28a for transceiver 20. FIG. 6 shows that the field of view 30 is completely out of the left half illumination projection 28b for transceiver 20.

Figure 7:
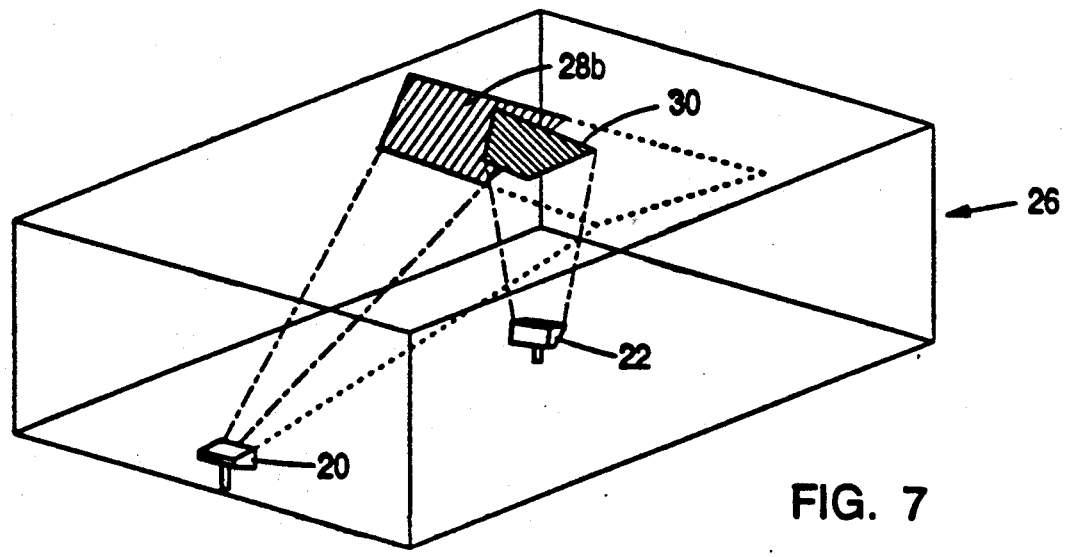

To properly align transceiver 20 and transceiver 22, transceiver 20 will toggle between left and right half transmissions while transceiver 20 looks within its field of view 30. While transmitting only left and right half illumination projections transceiver 20 can transmit appropriate information to indicate that only the left or right half of the array of LEDs is being utilized as appropriate. This information can be used to help center the field of view 30 for transceiver 22 as shown in FIG. 7.

One method of presenting the person aligning a unit with information useful in achieving proper alignment is to provide an indication of average received signal strength. Such an indication may be provided by the relative brightness of a visible light emitting diode.

As a new unit is aimed at different portions of the illumination projection it will receive varying amplitude signals. The amplitude of these signals may be used to produce a varying level of current through a visible light emitting diode, thus producing varying brightness.

The perceived brightness of the visible light emitting diode depends both on the magnitude of the current passing through it and the percentage of time during which the current flows. Thus two different types of information may be simultaneously provided to assist the user in aligning a unit.

Figure 1:
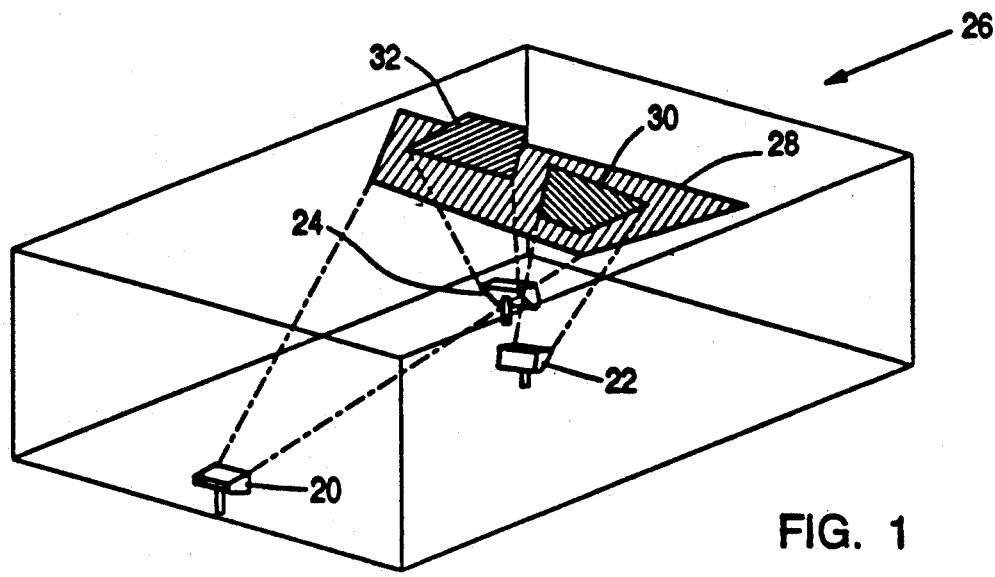
FIG. 1 is a perspective view of a problem solved according to the present invention.

As seen in FIG. 1, a transceiver such as transceiver 22 receives a relatively small portion of the illumination projection provided by transceiver 20. Since transceiver 22 is located relatively close to the center of the illumination projection, it receives a relatively stronger signal than units located at greater distances. By properly shaping the relationship between received signal strength and the current level flowing though the visible light emitting diode, it is possible to make the relative perceived brightness of the visible light emitting diode more dependent on the percentage of time during which the current flows than on the received signal strength variations. This is appropriate at high received signal levels and yields an aiming indication which varies approximately in proportion to the degree angular alignment.

At smaller signal levels such as would be received by a transceiver located at a greater distance from the illumination projection, the shaping of the relationship between received signal strength and the current level flowing through the visible light emitting diode will produce a more linear relationship than at stronger signal levels. Thus, the perceived brightness of the visible light emitting diode will depend on both the percentage of time during which the current flows and on the received signal strength variations. This provides the necessary alignment information to the person aligning the more distant unit to a distant transceiver's illumination projection.

Figure 8:
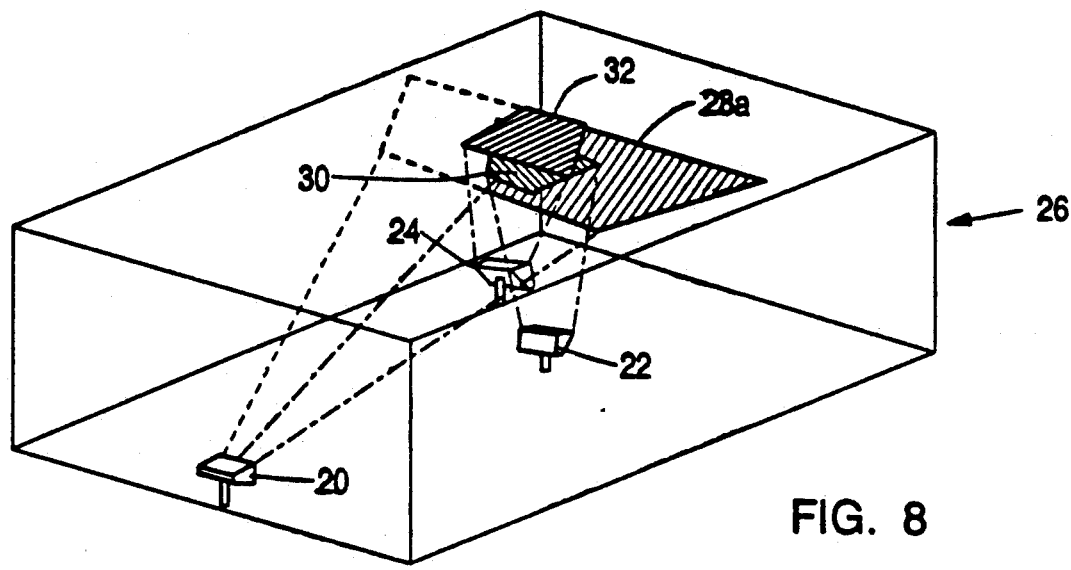

The illumination projection and field of view 32 of transceiver 24 can be centrally aligned to illumination projection 28 of transceiver 20 as shown in FIG. 8. This alignment can be repeated for each new resident that is added onto the network.

Figure 9:
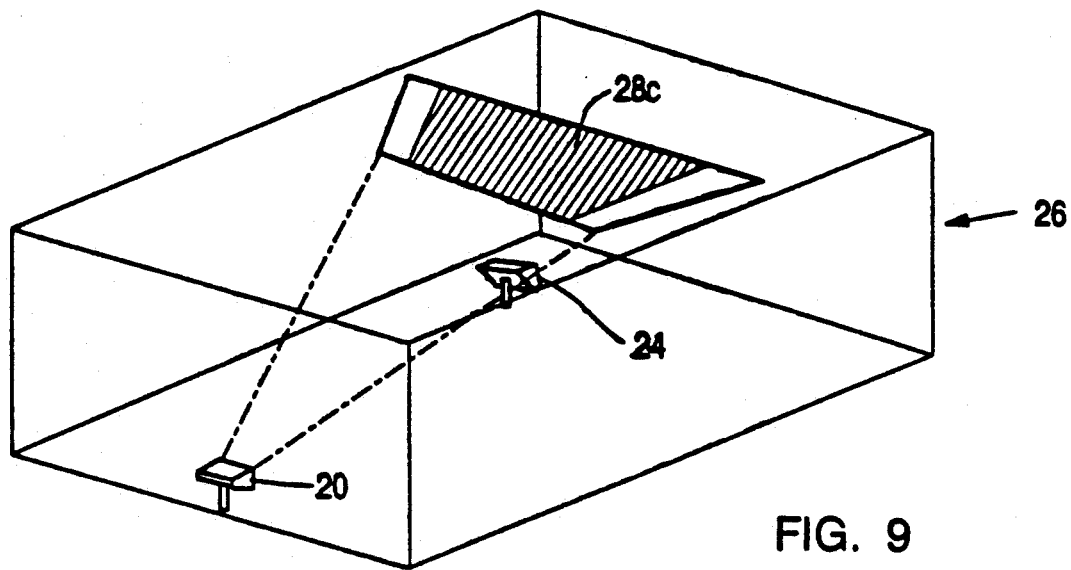
FIGS. 9-11 are perspective views of an alternate alignment technique.
Figure 10:
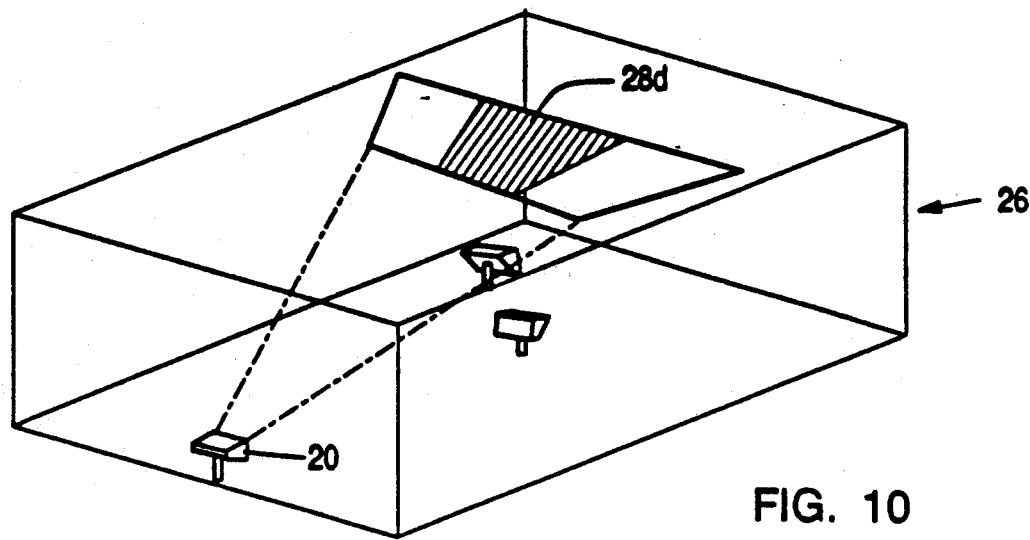
Figure 11:
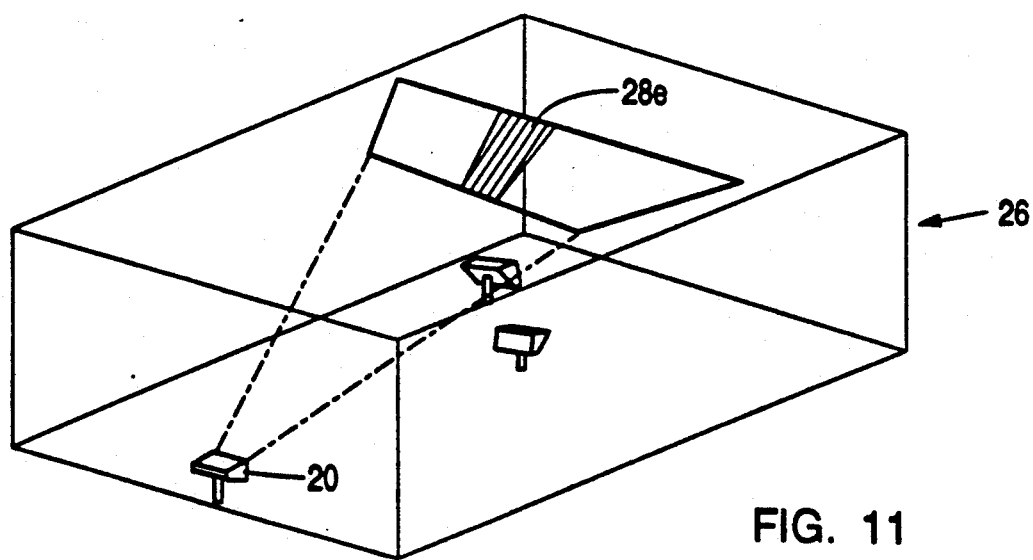
Figure 12:
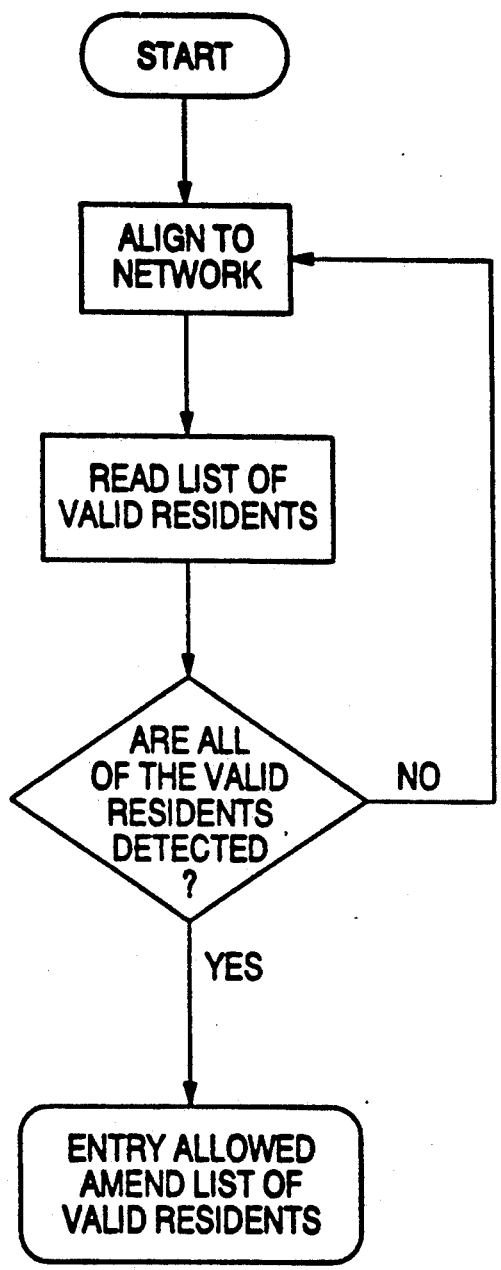
FIG. 12 shows a flow chart for gaining entry permission according to the present invention.

Other similar alignment techniques are possible using the present invention. For example, in FIG. 9 the outer two LEDs of transceiver 20 have been turned off forming illumination projection 28c. FIG. 10 shows that the outer two LEDs at each end have been turned off forming illumination projection d. FIG. 11 shows that the three LEDs at each end have been turned off forming illumination projection 28e. It should be apparent after reading the above disclosure for left right alignment that this technique can be used to align the illumination projection or field of view of multiple infrared transceivers to one another.

As a new resident is brought into an existing network or as the first resident on a new network is brought into operation, that new member will look into its field of view for an infrared information transmission. A new resident will not transmit before observing in its field of view so that it will not cause a collision on the network.

After watching for a predetermined period of time during which no transmission was received the resident will make its proper network announcement. The announcement includes four messages:
  1. The announcers identification number
  2. The list of all residents it recognizes
  3. Stating that it is transmitting left half
  4. Stating that it is transmitting right half The first resident in a network announces: "I am number one. I am alone. Here are my left four LED's. Here are my right four LED's." The machine will then pause and watch in its field of view for a predetermined time period and then repeat the message.

As a two residents are brought together to form a connection, that resident which first detects the infrared transmission from the other resident will recognize the other resident as number "1" and increment its own address to number "2". Once number "2" has heard the entire announcement from number "1" number "2" will respond:
  1. I am number "2".
  2. I see number "1".
  3. Here are my left four LEDs.
  4. Here are my right four LEDs.

Number "1" will then amend its list to include number "2". Number "1"'s announcement now reads:
  1. I am number one.
  2. I see number two.
  3. Here are my left four LEDs.
  4. Here are my right four LEDs.

As a third resident is brought into the network it is possible, as described above, that it can see only one of the two resident members on the network. For example, it might only see resident number "2". As resident number "3" watches it will see resident number "2" transmit:

1. I am number "2".
2. I see number "1".
3. Here are my left four LEDs.
4. Here are my right four LEDs.

Number "3" now knows that there are two residents on the network. Number "3" must remain silent until it can see all the announced members on the list, i.e. both number "1" and number "2". Until that time number "3" does not have permission to enter the network. Once number "3" becomes properly aligned it can see both number "1" and number "2" announce their full messages. After number "2" has completed its full message, resident number "3" will then announce:

1. I am number "3".
2. I see number "1" and number "2".
3. Here are my left four LEDs.
4. Here are my right four LEDs.

Resident number "1" and resident number "2" will then both amend their list of valid residents to include resident number "3". If one of the residents drops out of the network for some reason, the list of valid residents on the network for each remaining resident is amended to delete that number. Each remaining resident maintains their original valid resident number.

Once a resident no longer has proper alignment it fails to recognize every valid resident. For example, if resident "2" can no longer recognize one or more of the valid residents it will stop any further transmissions and must repeat the entry permission procedure described above. After resident "1" makes its announcement resident "3" will wait a predetermined time for resident "2" to announce. Once resident "2" fails to make its announcement resident "3" will amend its valid resident list and announce:

1. I am number "3".
2. I see number "1".
3. Here are my left four LEDs.
4. Here are my right for LEDs.

Where a human operates to align a new resident to a network it is possible for that individual to overshoot the illumination spot on the ceiling. In the preferred embodiment, a single lens with two LEDs will be positioned on the outside of the box for the aligning person to see. One LED will be red and the other will be green. When no alignment is detected, the red LED will be illuminated. Once proper alignment is detected by the receiving portion of the transceiver the red light is extinguished and the green light is illuminated. To assist in centering the illumination spot of this new resident with the remaining residents on the network as the intensity of the received data increases the intensity of the LEDs also increases.

Another alternate embodiment for improved ease of alignment is to mount a receiver on either side of the transceiving apparatus. The phase difference measured between these two receivers can be used to properly align the transceiver to the network, in the azimuth plane. Similarly, if these two receivers have their optical axis at a small elevation angle to each other, the amplitude difference in their received signals can be used to properly align the transceiver to the network in the elevation plane.

A method and apparatus has been disclosed for aligning residents to a network having infrared as the communication medium.

What is claimed is:

1. A method for aligning multiple residents to a network, wherein the communication medium for the network is infrared radiation and each resident that transmits information has an infrared transmitter including an in line collection of transmission sources, wherein the improvement comprises:
   a. alternately activating a portion of the transmission sources for each transmitter forming a partial transmission thereby and
   b. ensuring that every resident can recognize each partial transmission as being sent by each respective transmitter.

2. The method according to claim 1 further comprising a method for preventing a prospective new resident from entering the network until it can recognize each partial transmission.

3. The method according to claim 2 further comprising a method for granting permission to a prospective new resident to the network enter the network after it can recognize each partial transmission.

4. The method according to claim 3 wherein the prospective new resident announces that it is joining the network after it verifies that it can communicate with each other resident.

5. The method according to claim 4 wherein each resident of the network periodically announces that it is a resident and identifies each resident that it recognizes.

6. The method according to claim 5 wherein a resident automatically ceases further transmission after it fails to recognize each partial transmission.

* * * * *

UNITED STATES PATENT AND TRADEMARK OFFICE
CERTIFICATE OF CORRECTION

PATENT NO. : 5,245,460
DATED : 09/14/93
INVENTOR(S) : RICHARD C. ALLEN ET AL.

It is certified that error appears in the above-identified patent and that said Letters Patent is hereby corrected as shown below:

In column 5, line 22, please delete "I" and replace with --1--.

Signed and Sealed this

Twenty-second Day of March, 1994

Attest:

BRUCE LEHMAN

*Attesting Officer*  *Commissioner of Patents and Trademarks*